United States Patent [19]

Kara

[11] Patent Number: 4,683,511
[45] Date of Patent: Jul. 28, 1987

[54] HEAD AND GUIDE CLEANING DEVICE FOR VIDEO TAPE RECORDER

[76] Inventor: Stephen Kara, 2609 Sapra St., Thousand Oaks, Calif. 91360

[21] Appl. No.: 546,506

[22] Filed: Oct. 28, 1983

Related U.S. Application Data

[63] Continuation-in-part of Ser. No. 325,923, Nov. 30, 1981, Pat. No. 4,462,056.

[51] Int. Cl.[4] ............ G11B 23/02; G11B 5/025; G11B 5/008; G11B 15/00
[52] U.S. Cl. .................... 360/132; 360/85; 360/95; 242/198
[58] Field of Search ............. 360/132, 85, 95, 128; 242/198, 199

[56] References Cited

U.S. PATENT DOCUMENTS

| | | | |
|---|---|---|---|
| 3,647,990 | 3/1972 | Eul | 360/132 |
| 3,911,491 | 10/1975 | Terao | 360/85 |
| 4,027,832 | 6/1977 | Lopata | 360/95 |
| 4,078,742 | 3/1978 | Steipe | 360/132 |
| 4,122,506 | 10/1978 | Kubo | 360/132 |
| 4,383,660 | 5/1983 | Richard et al. | 360/95 |
| 4,387,411 | 1/1983 | Clausen | 360/128 |

FOREIGN PATENT DOCUMENTS

| | | | |
|---|---|---|---|
| 57-24018(A) | 8/1982 | Japan | 360/128 |
| 58-94174(A) | 6/1983 | Japan | 360/132 |

*Primary Examiner*—John H. Wolff
*Assistant Examiner*—Alfonso Garcia
*Attorney, Agent, or Firm*—Koppel & Harris

[57] ABSTRACT

A blocking member in the form of a short member attached to the front face of a cassette housing in front of the guide of the tension sensor of the video tape recorder blocks the movement of that guide to prevent the cleaning tape from being under too much tension which would otherwise slow or prevent movement of the tape through the various guides and heads in the video recorder and also could stop rotation of the video record/playback head drum.

8 Claims, 3 Drawing Figures

HEAD AND GUIDE CLEANING DEVICE FOR VIDEO TAPE RECORDER

This application is a continuation-in-part of my pending application Ser. No. 325,923, filed Nov. 30, 1981, and now U.S. Pat. No. 4,462,056, July 24, 1984.

BACKGROUND OF THE INVENTION

1. Field of the Invention

This invention relates to cleaning devices for video tape recorders, and more particularly to cleaning devices which operate on all of the operating heads and tape guides in the recorder tape path.

2. Description of the Prior Art

During normal operation of a video tape recorder, deposits from the video tape can accumulate on the internal recorder elements, causing a fuzzy or "snowy" picture and distorted sound. The picture and sound distortion becomes worse with each successive playback as the deposits continue to accumulate. In an attempt to resolve this problem, several cleaning devices are presently available on the market for cleaning the internal elements of a video tape recorder and restoring a clear picture and good sound quality.

In one popular type of cleaning device an abrasive cleaning tape is packaged in a standard video tape cassette. The cleaning cassette is inserted into the recorder and played in the standard manner so that the abrasive tape surface acts against the various internal operating heads and tape guides to remove accumulated deposits. The tape is provided with transparent leaders at each end which permit the completion of a light path between a standard light source and sensors within the recorder, thus signalling the end of the tape and the completion of a full tape pass. A typical cleaning cassette of this type is provided by the 3M Company under the trademark Scotch.

While the above type of prior art tape cleaner effectively removes accumulated deposits, their abrasive surfaces can damage the tape heads through excessive use. It is typically recommended that only two to four passes of the tape be made at any time, in order to avoid excessive wear. For example, the 3M Company cleaning cassette referred to above provides a specially recorded test message which is displayed on the screen as the cleaning tape is run. One monitors the screen to observe when the test message becomes clear, indicating that the heads have been cleaned. At that point the operator quickly stops the tape to avoid excessive wear on the heads. Even with this type of safeguard, however, it is possible to allow the cleaning tape to run for too long and damage the recorder.

Another type of tape cleaner is exemplified by the product produced by Allsop Corporation. This tape cleaner uses a non-abrasive synthetic suede material, thus avoiding the problems of excessive wear inherent in the more common abrasive tapes. The cleaning tape is relatively heavy, being about 0.025 inch (0.6 mm) thick. Rather than running the tape along the normal tape path as with the abrasive cleaners, in the Allsop device the tape is extended so that it wraps only about one-sixth of the circumference of the rotating drum that carries record/play heads, contacts only about the lower fourth of the portion of the drum so that it does not touch and clean the entire drum and grooves, and remains stationary as the drum rotates against the tape. While this device cleans the lower quarter of the drum without the wear problem introduced by the abrasive tapes, the cleaning action is not as efficient because of the relatively lesser amount of contact between the cleaning tape and the drum. Furthermore, the Allsop device does not clean any of the recorder operating heads or tape guides other than the record/play head, pinch roller and capstan drive. It also lacks a protective door to protect the tape.

The transparent leaders referred to above are added at each end of some conventional abrasive cleaning tapes for use on VHS video tape recorders; for some Beta video tape recorders a flexible metallic conductive leader is attached to each end of the tape to activate the recorder's shut off device. Both the transparent and metallic leaders are subject to breakage and make the tapes more difficult to produce. The Allsop VHS cleaning tape provides an opening toward the end of the tape itself, rather than a transparent leader. However, since the Allsop tape is not run through the recorder but is only extended far enough to make contact with the record/play head and is thereafter retracted, the completion of a light path through the opening in the tape merely indicates the maximum extension of the tape, allowing only a momentary contact between the cleaning tape and the rotating head.

In the Allsop device a portion of the cleaning tape is first moistened with a fluorocarbon cleaning fluid. The fluid is applied to the exposed portion of the tape. Leaving the tape exposed however, makes it possible for dirt to lodge on the tape and for people to foul the tape by handling it.

Another example of a cleaning device is shown in Clausen, U.S. Pat. No. 4,387,411 (1983). There is shown a cleaning tape that is withdrawn from the cassette and wrapped partially around the rotating head in a manner similar to video tape. Because the cleaning tape is thicker it exerts greater friction on the rotating recorder/playback head than video tape exerts, the cleaning tape may not feed through the recorder and can actually stop the head from rotating so that it ceases its cleaning action.

The cleaning tape in this patent is pulled into contact with the rotating head and the erase and audio heads by tape guides of the recorder that fit into indentations in the front face of the cassette housing behind the tape when the cassette housing is properly inserted into the recorder. When the recorder is actuated, these guides pull the tape out of the cassette into contact with the rotating record/playback video heads and the other head. Applicant's patent U.S. Pat. No. 4,462,056 teaches partially limiting the travel of at least one of the movable guides to prevent over-tensioning of the tape against the heads in the recorder. The device protrudes somewhat from the front face of the cassette.

SUMMARY OF THE INVENTION

In view of the above problems associated with the prior art, it is an object of the present invention to provide a novel and improved cleaning device for a video tape recorder, which employs a cleaning medium that does not endanger the recorder elements by the possibility of excessive wear during normal cleaning operations.

It is a further object of the invention to provide a novel and improved cleaning device for a video tape recorder that not only avoids abrasive wear but also effectively cleans all of the recorder's operating heads, capstan drive and tape guides in the normal tape path.

Another object of the present invention is the provision of blocking one of the movable guides that tensions the tape in such a manner that the guide does not move. Another object is to accomplish the blocking of this guide in a simple, low cost manner.

The cleaning device of the present invention is used in a VHS or other similar video tape recorder of the type in which video tape moves between two reels along a predetermined path in moving contact with the plurality of operating heads and tape guides. The cleaning device has a cassette housing adapted to be inserted into the recorder in a manner of a video tape cassette. The cassette housing has a front wall with at least one indentation for receiving a movable tape guide of the video tape recorder. The housing supports a pair of tape reels for rotation, and a cleaning tape is carried on the reels. The video tape recorder advances the tape along the recorder tape path from one reel to the other in moving contact with the operating heads and tape guides when the housing is inserted into the recorder and the recorder is operated. The present invention accomplishes its objects by the improvement that comprises blocking means fixed to the front wall of the cassette housing and extending into the indentation for blocking the movement of the movable tape guide in the indentation. The blocking means is parallel to the front face of the cassette and extends only partially over the front of the indentation to allow another tape guide initially in the same indentation to move out of the indentation and pull the tape to the heads.

DETAILED DESCRIPTION OF THE PREFERRED EMBODIMENT

Figure 1:
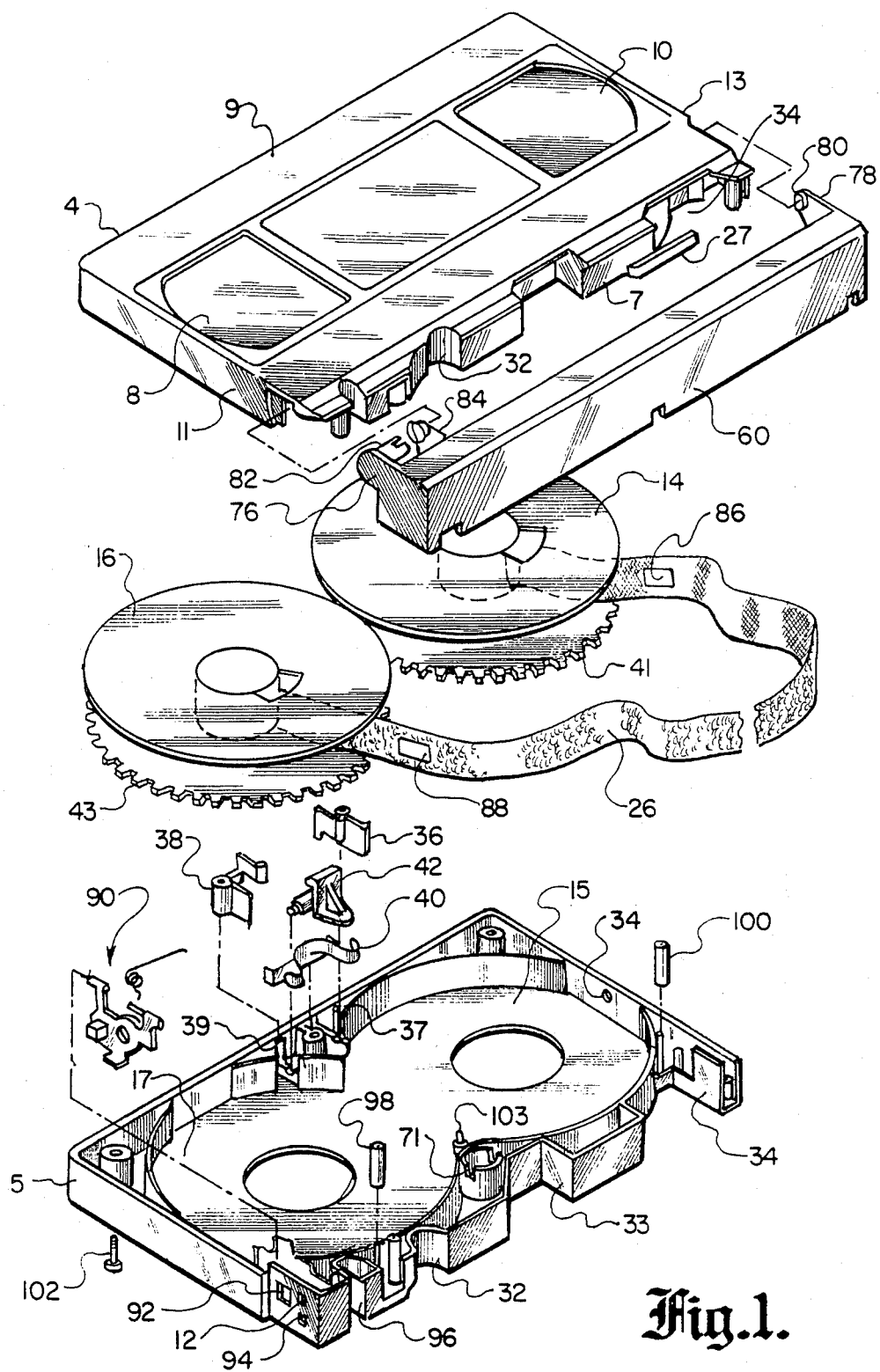
FIG. 1 is an exploded perspective view of the components of the cleaning device.

The cleaning device of the present invention includes a cassette housing adapted to be inserted into the recorder in the manner of a video tape cassette. In the exemplary embodiment, VHS cassette housing 3 (FIGS. 2 and 3) has an upper body member 4 and a lower body member 5 (FIG. 1) which fit over each other to form a rectangular cassette having a front face or wall 7, a top face or wall 9, and side walls 11 and 13. Two reels 14 and 16 are mounted in areas 15 and 17 respectively where they can rotate within the cassette housing. The top and bottom body members are attached together through desired fastening means such as screws 102, 103.

Windows 8 and 10 through top face 9 of upper body portion 4 are provided for viewing reels 14 and 16 and the tape on the reels. A protective access door 60 is pivotally mounted in appropriate receiving means along sides 11 and 13 of the cassette housing. Essentially, a protection 80 extending inwardly from flange 78 of access door 60 is journaled for pivoting in an opening in side wall 13. Notched pin 82 on flange 76 has a spring 84, which biases access door 60 normally closed. A conventional spring biased access door release element 90 is mounted in the lower housing section 5 separated from a pair of tabs 92 and 94, which actuate the door release lever. Slot 96 is formed in the front wall of the housing to allow access for an arm on the recorder that automatically opens access door 60 when cassette 3 is inserted into the recorder.

FIG. 1 also shows tape 26 fully extended from each of its reels 14 and 16, and opening 86 and 88 near each end of the tape are visible. When tape 26 has reached one end of a run, one of the openings 86 or 88 will be aligned with the recorders light source 70 (FIGS. 2 and 3) in boss 71 aligned with opening 12 in wall 11 or another opening in wall 13 and with photocell detectors 72 and 74 (FIGS. 2 and 3) so that light can travel between light source 70 and a detector 72 or 74 to terminate movement of the tape. This system is explained in more detail in applicant's U.S. Pat. No. 4,462,056.

Cleaning tape 26 is made from a non-abrasive material, preferably a "doe" type of synthetic suede with a pattern of upstanding bristles on the one side and either a smooth surface or another bristled surface on the other side. Cleaning tape 26 is attached to reels 14 and 16 so that the bristles are on the side of the tape that comes into contact with the recorder heads. The bristles can extend into the circumferential grooves normally provided around the periphery of the record/play head drum 56 (FIGS. 2 and 3) and gently scrub the head as the tape travels past it to remove deposits from the periphery of the head and the entire drum including its grooves.

it is necessary to wet the cleaning tape with an appropriate cleaning fluid such as a fluorocarbon solvent before the tape is inserted into the recorder. As explained in applicant's U.S. Pat. No. 4,462,056 it is best not to open access door 60 to expose the underlying tape for application of cleaning fluid. A small aperture 34 is therefore formed in side wall 13 either in upper half 4 or as shown in lower half 5 of the cassette housing 3. Alternatively, a portion of aperture 34 could be aligned through a portion of side wall 13 in both the top and bottom members 4, 5. Aperture 34 should be located about half way between the top and bottom of the cassette in alignment with tape 26 and is just large enough so that a conventional, plastic squeeze bottle containing a fluorocarbon liquid can be inserted into the aperture when the cassette stands on side 11. A few drops of the liquid are dripped onto the surface of the cleaning tape while it is still wound on the reel. The liquid seeps through several layers of tape 26 in the area immediately below aperture 34 to create an alternating wet and dry pattern on the tape, which enhances its cleaning action.

Because the cleaning tape 26 must be transported through the cassette and makes moving contact with the various recorder/player operating heads, capstan drive and tape guides, the tape is relatively thin. Various rollers 98, 100, which extend between upper body member 4 and lower body member 5 guide the tape, and a tension relief arm may also be provided. Reels 14 and 16 are prevented from rotating when the cleaning cassette is not mounted in the recorder by means of a conventional locking mechanism comprising a pair of locking arms 36 and 38 mounted on posts 37 and 39 inside cassette 3 and engaging corresponding detents 41 and 43 on the periphery of tape reels 14 and 16. Locking arms 36 and 38 are normally biased into a position engaged in detents 41 and 43 by spring 40. When the cassette is inserted into the VHS format player/recorder, an arm on the recorder/player presses up against release lever 42, which in turn releases locking arms 36 and 38 from detents 41 and 43, permitting the reels to rotate under the control of the recorder.

Figure 2:
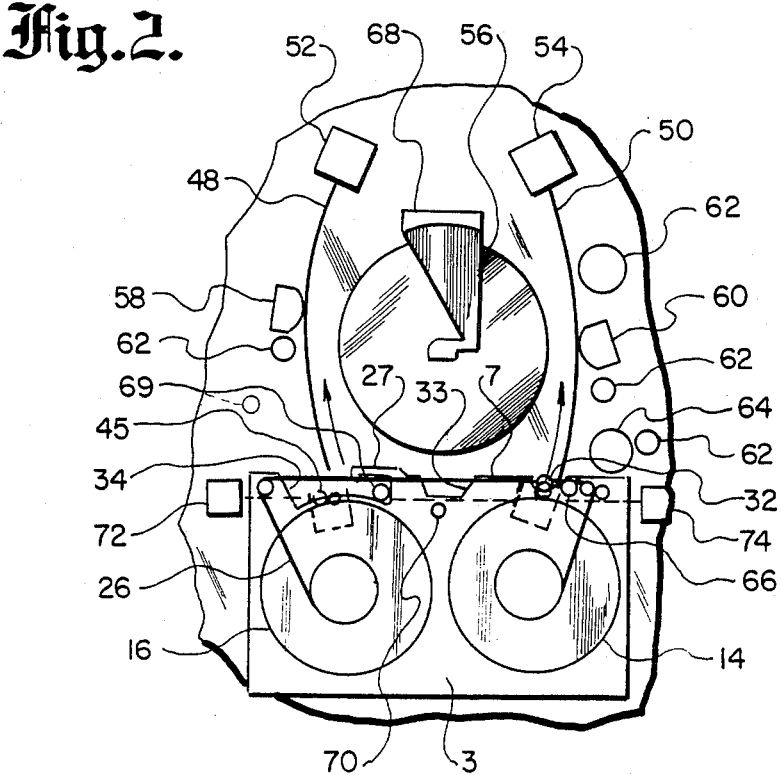
FIGS. 2 and 3 are plan views illustrating the internal operating mechanism of the cleaning device at the initial insertion into a video tape recorder (FIG. 2) and with the tape pulled out by the recorder to a cleaning position (FIG. 3).
Figure 3:
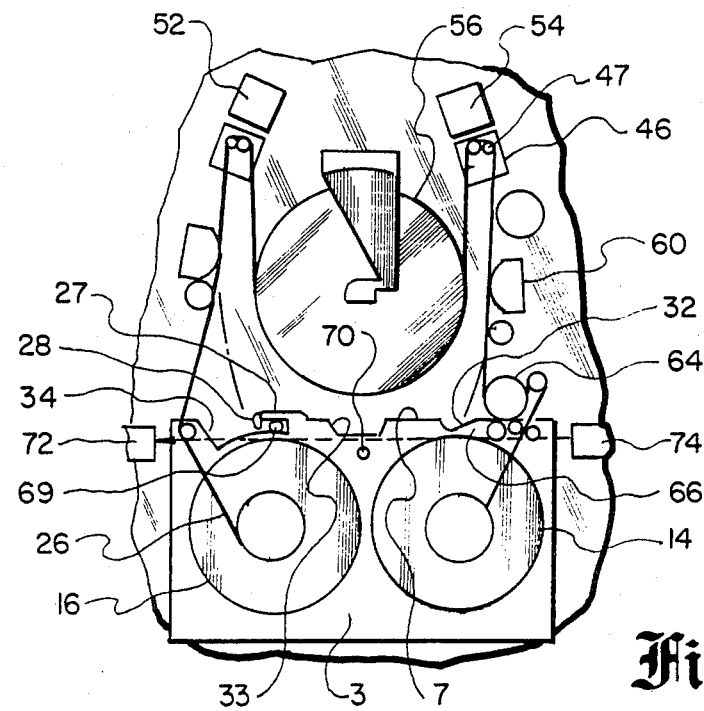

There are three indentations 32, 33 and 34 on front face 7 of the cassette. As shown in FIG. 2, when cassette 3 is inserted into the recorder, a pair of upstanding tape guide posts 45 and 47 mounted on sleds 44 and 46 respectively are positioned in indentations 34 and 32 respectively such that guide posts 45 and 47 are immediately behind the tape. Sleds 44 and 46 move respectively along tracks 48 and 50 from the position below indentations 34 and 32 to a position adjacent sled stops 52 and 54 along tracks 48 and 50 (FIG. 3). In FIG. 3, the operating mode, drive capstan 66 and pinch roller 64 drive tape 26 past video record/playback head drum 56, erase head 58 and audio and control head 60. Various guide rollers 62 help control the tape path.

VHS recorders also have tension sensor 69. when cassette 3 is first inserted into the recorder (FIG. 2), the upstanding guide of tension sensor 69 is located behind tape 26. In normal operation using magnetic tape, sensor 69 moves to its position shown in phantom in FIG. 3 pulling tape partially around guide 63, which is the recorder tape path (see tape in phantom). Because cleaning tape 26 is thicker and has a higher coefficient of friction than magnetic tape, if tension sensor 69 operated normally, tape 26 would tend to apply too much force to rotating record/playback head 56 and the other elements which would inhibit the movement of tape 26 and possible stop the rotation of head drum 56 and the recorder.

Therefore, the present cleaning device has been improved by the addition of blocking means fixed to front wall 7 of the cassette housing and extending into indentation 34 for blocking the movement of sensor 69. In the exemplary embodiment, blocking means 27 comprises a short piece of plastic approximately ¾ in. (20 mm) in length and extending aproximately ½ in. (12 mm) laterally into indentation 34 parallel with front face 7. In FIG. 1 it is shown nominally attached to the upper body member 4, but it cal also be attached to the lower body member 5 or to both along the line joining the two members. Blocking means 27 extends only partially over the front of indentation 34 so that tape guide 45 on sled 44 is free to move from its FIG. 2 to its FIG. 3 position. In its location shown in the exemplary embodiment, blocking member 27 does not interfere with door 60.

Blocking member 27 in the exemplary embodiment may have a short inward hook 28 that insures that member 27 captures guide 69. Guide 69 in some recorders exerts force along member 27 such that without hook 28, guide 69 might slip past member 27.

Various modifications and changes may be made in the configuration described above that come within the spirit of this invention. The invention embraces all such changes and modifications coming within the scope of the appended claims.

I claim:

1. In a cleaning device for a video tape recorder of the type adapted to move a video tape between two reels along a predetermined path in moving contact with a plurality of operating heads and tape guides, the cleaning device having a cassette housing adapted to be inserted into the recorder in the manner of a video tape cassette, the cassette housing having a front wall with at least one indentation for receiving a tape contacting member of the video tape recorder, which is movable from a position in the indentation to a position out of the indentation, a pair of tape reels rotatably supported within the housing, a cleaning tape carried on the reels and adapted to be advanced by the video tape recorder along the recorder tape path from one reel to the other reel in moving contact with the operating heads and tape guides when the cassette housing is inserted into the recorder and the recorder operated, wherein the improvement comprises:

blocking means fixed to the front wall of the cassette housing extending into one of the indentation for blocking the movement of the movable tape contacting member from within the indentation to without the indentation.

2. In the cleaning device of claim 1 wherein the indentation having an open, front the improvement further comprising the provision of the blocking means extending partially over the front of the indentation.

3. In the cleaning device of claim 1, the indentation having a closed, rear portion and a forward, open portion, the improvement further comprising the provision of the blocking means being mounted at the forward portion of the indentation.

4. In the cleaning device of claim 1 the improvement further comprising the provision of the cassette housing having a front wall generally parallel to a plane passing through the axes of the rotation of the reels, the blocking means being parallel to the front wall of the cassette housing.

5. In the cleaning device of claim 4, the improvement further comprising the provision of a door, means between the door to the cassette housing for pivotally mounting the door to the cassette housing between a storage position over the front face and the blocking means and pivotable to an operating position exposing the front face of the cassette housing.

6. In the cleaning device of claim 3, the improvement further comprising the provision of a door, means between the door and the cassette housing pivotally mounting the door to the cassette housing between a storage position over the front face and the blocking means and to an operating position exposing the front face of the cassette housing.

7. In the cleaning device of claim 1 wherein the video tape recorder has another movable tape contacting member positioned in the indentation adjacent the first tape contacting member, the blocking means terminating at a location spaced apart from the other tape contacting member to permit the second tape guide member to be withdrawn from the housing.

8. In the cleaning device of claim 1 wherein the blocking means has a hook extending into the indentation.

* * * * *